United States Patent Office 3,442,838
Patented May 6, 1969

3,442,838
NON-TOXIC COMPOSITIONS COMPRISING VINYL CHLORIDE RESIN, METAL SALTS AND ROSIN OR ESTER THEREOF
Yuji Hoshi and Akira Kaneko, Nakoso-shi, Japan, assignors to Kureha Kagaku Kogyo Kabushiki Kaisha, Tokyo-to, Japan, a joint-stock company of Japan
No Drawing. Filed Dec. 7, 1965, Ser. No. 512,193
Claims priority, application Japan, Dec. 9, 1964, 39/69,311
Int. Cl. C08f 29/18
U.S. Cl. 260—23
5 Claims

ABSTRACT OF THE DISCLOSURE

A composition containing a vinyl chloride polymer, characterized by transparency and non-toxicity, comprising 100 weight parts of a vinyl chloride homopolymer or a copolymer essentially consisting of units derived from vinyl chloride, 0.5 to 5 weight parts of a non-toxic stabilizer consisting of a calcium salt of an aliphatic monocarboxylic acid and a zinc salt of an aliphatic monocarboxylic acid, 0.05 to 2 weight parts of rosin acid or an ester thereof and a small amount of an epoxidized vegetable oil.

This invention relates to compositions containing vinyl chloride polymers, and more particularly to rigid vinyl chloride polymer (hereinafter termed PVC) which is incorporated with a calcium salt of an aliphatic acid and a zinc salt of an aliphatic acid which are non-toxic stabilizers and rosin acid or ester thereof.

It is an object of this invention to provide compositions containing vinyl chloride polymers which are suitable for extruding or moulding to provide articles having excellent transparency, flatness and smoothness.

A mixture of a calcium salt of an aliphatic acid and a zinc salt of an aliphatic acid is the only practical non-toxic stabilizer for polyvinyl chloride (PVC) and is permitted by the FDA (U.S. Food and Drug Administration), satisfying a regulation that provides for the case wherein additives contained in PVC articles are transferred into foodstuffs contained therein to cause sanitary problems.

Utilization of this mixture of metal salts impairs the transparency of the product, the inherent characteristic of PVC, thus producing a white opaque appearance. For this reason, use of this mixture has been limited to certain applications. Therefore, the field of application of PVC at packaging material for foodstuffs could be enlarged if it were possible to obtain transparent PVC products by using said non-toxic stabilizer and conventional forming machines.

The present invention contemplates the provision of improved compositions consisting of vinyl chloride polymer or a copolymer essentially consisting of vinyl chloride and incorporated with a non-toxic stabilizer consisting of a calcium salt of an aliphatic acid and a zinc salt of an aliphatic acid, and rosin acid or an ester thereof, whereby to provide articles of excellent transparency and non-toxicity.

When incorporated into PVC and then processed on a laboratory scale, the stabilizer consisting of a mixture of a calcium salt of an aliphatic acid and a zinc salt of an aliphatic acid can readily produce transparent products but, unexpectedly, when processed by commercial extruding machines or injection moulding machines in the same manner as ordinary PVC, it is very difficult to obtain clear and transparent products.

It is believed that the reason for this is that, while in experimental operations wherein a small quantity of material is kneaded at an elevated temperature for a long period, molten metal salts of an aliphatic acid, for example, calcium stearate and zinc stearate which are utilized most frequently, are finely dispersed in PVC during the kneading operation because the melting points of calcium searate and zinc stearate are 120° C. and 160° C., respectively, in commercial fabricating machines the interval of time during which the pulverized stabilizer is caused to finely disperse is short because the interval during which the mixture of PVC and the pulverized stabilizer is treated in the fabricating machine at a temperature higher than the melting point of the stabilizer is short. In addition, the fluidity of the stabilizer is poor, so that it is impossible to thoroughly disperse the pulverized stabilizer as desired in PVC, whereby products of opaque appearance are produced.

The reason why the addition of rosin acid or an ester thereof to the mixture consisting of PVC, a calcium salt of an aliphatic acid and a zinc salt of an aliphatic acid in accordance with this invention results in transparent products is that the rosin acid or ester thereof is effective in lowering the flow temperature of these metal salts of aliphatic acid to cause sufficient micro-dispersion thereof during the limited interval of kneading operation in forming machines, thus producing clear and transparent products. In carrying out this invention, to 100 weight parts of vinyl chloride polymer or a copolymer essentially consisting of vinyl chloride, there are added 0.5 to 5 weight parts of a mixture of a calcium salt of an aliphatic acid and a zinc salt of an aliphatic acid, which serves as the non-toxic stabilizer, and 0.05 to 2 weight parts of rosin acid or an ester thereof. Among the metal salt soaps utilized in this invention, there are indicated calcium salt soaps, zinc salt soaps, and magnesium salt soaps and among the metal salt soaps, there are stearate, laurate, ricinoleic, octoate, ethylacetoacetate and the like.

It is to be understood that among these metal salt soaps, there are also included a mixture of these salts of high purity, and a mixed stabilizer to which other non-toxic stabilizers, plasticizers, antioxidants or the like are added.

Among the rosin acids utilized in this invention, there are included mixed rosin acids, isolated abietic acids, pimaric acid, and hydrogenated dihydro- or tetrahydro-abietic acid, and among the rosin acid esters, there are included methyl- or ethyl esters or rosin acid, abietic acid and hydrogenated abietic acid, and esters of ethylene glycol, diethylene glycol, triethylene glycol, polyethylene glycol and the like. When used in a proportion of more than 0.05 weight parts, these rosin acids and their esters can provide their unique effects. However, use of more than 2 weight parts is not advisable because of the limitation of their compatibilities with polyvinyl chloride.

Although it is preferable to mix beforehand rosin acid or an ester thereof with the metal salts of aliphatic acids and then add the mixture to PVC, rosin acid or an ester thereof and metal salts of aliphatic acids may be added independently.

The composition of this invention can be utilized to produce clear and transparent final products by supplying powder thereof to conventional shaping machines such as extruders, calenders and injection moulding machines. The composition can also be used in the so-called pellet extruding technique wherein preliminary processing machines are used before supplying the composition to moulding machines.

The present invention may be further illustrated by the following specific examples which are not to be taken as limiting the spirit or scope of the appended claims.

Example 1

Composition 1: Parts by weight
- PVC (p̄–700) — 100
- Calcium stearate — 0.7
- Zinc stearate — 0.7
- Epoxidized soybean oil (oxirane oxygen content 6%) — 5.0
- Diethylene glycol ester of hydrogenated rosin acid — 0.2

Composition 2:
- PVC (p̄–700) — 100
- Calcium stearate — 0.7
- Zinc stearate — 0.3
- Epoxidized soybean oil (oxirane oxygen content 6%) — 5.0

Ingredients of each of compositions 1 and 2 were mixed by vane blenders for 2 hours at 80° C., extruded by a screw type extruder into cylindrical form and moulded into bottles by a blow mould of bottle shape.

It was found that the composition 1 was formed into excellent transparent moulded bottles having flat and smooth surfaces, but the composition 2 was formed into semi-transparent moulded bottles having rough surfaces.

The composition 1 containing 0.7 weight part of calcium stearate, 0.3 weight part of zinc stearate, and 0.2 weight part of diethylene glycol hydrogenated rosinate-melted partly at 70° C., begin to flow at 95° C., and completely melted at 160° C. In contrast, the composition 2 containing 0.7 weight part of calcium stearate, and 0.3 weight part of zinc stearate melted partly at 118° C., began to flow at 158° C., and completely melted at 165° C. For this reason the composition 1 results in more transparent products than the composition 2.

Example 2

To 100 weight parts of copolymer (p̄–750) consisting of 98 weight percent of vinyl chloride and 2 weight percent of cetyl vinyl ether, adjuvants as specified in the following table were added, and each resultant mixture was blended for 2 hours at 80° C. by means of a vane blender and then formed into sheets of 0.3-mm. thickness by means of a screw extruder provided with a T-die.

| Composition | Parts by weight | |
|---|---|---|
| | 1 | 2 |
| Calcium stearate | 0.5 | 0.5 |
| Magnesium stearate | 0.2 | 0.2 |
| Zinc stearate | 0.3 | 0.3 |
| Epoxidized soybean oil (oxirane oxygen content 6%) | 8.0 | 8.0 |
| Pentaerythritol ester of hydrogenated abietic acid | 0.5 | 0 |
| Melting point of the composition (°C.) | 148 | 160 |

Sheets formed from the composition 1 showed excellent transparency and surface luster, whereas sheets formed from the composition 2 had coarse surfaces, had lost transparency and were coloured, partially decomposed products having been produced, so that it was impossible to produce formed sheets of good quality therefrom. The composition 2 modified by adding thereto 0.5 part of a derivative of rosin acid showed a decrease in the melting point, and extruded products were transparent and showed excellent surface property, as shown in the following table:

| Compositions: | Apparent melting point temperature ° C. |
|---|---|
| 2 | 160 |
| 2+methyl ester abietate (0.5 part) | 134 |
| 2+ethylene glycol ester of pimaric acid (0.5 part) | 142 |
| 2+rosin acid (0.5 part) | 144 |
| 2+purified rosin (0.5 part) | 149 |

Thus it will be seen that the present invention provides compositions containing vinyl chloride polymer from which clear and transparent products having smooth and flat surfaces can be produced.

What is claimed is:

1. A composition containing a vinyl chloride polymer characterized by transparency and non-toxicity comprising 100 weight parts of a vinyl choride homopolymer or a copolymer consisting essentially of units derived from vinyl chloride, 0.5 to 5 weight parts of a non-toxic stabilizer consisting of a calcium salt of an aliphatic monocarboxylic acid and a zinc salt of an aliphatic monocarboxylic acid, 0.05 to 2 weight parts of rosin acid or an ester thereof and a small amount of an epoxidized vegetable oil.

2. A composition according to claim 1 wherein said calcium salt is selected from the group consisting of calcium stearate and calcium laurate.

3. A composition according to claim 1 wherein said zinc salt is selected from the group consisting of zinc stearate and zinc ricinoleate.

4. A composition according to claim 1 wherein said rosin acid is selected from the group consisting of mixed rosin acids, isolated abietic acid, pimaric acid, hydrogenated dihydroabietic acid, and tetrahydroabietic acid.

5. A composition according to claim 1 wherein said ester of rosin acid is selected from the group consisting of methyl and ethyl esters of rosin acid, abietic acid and hydrogenated abietic acid, and esters of ethylene glycol, diethylene glycol, triethylene glycol, pentaerythritol and polyethylene glycol with rosin acid, abietic acid and hydrogenated abietic acid.

References Cited

UNITED STATES PATENTS

| | | | |
|---|---|---|---|
| 2,564,646 | 8/1951 | Leistner et al. | 260—45.7 |
| 3,003,999 | 10/1961 | Kauder et al. | 260—45.75 |
| 3,054,771 | 9/1962 | Hiestand et al. | 260—23 |
| 3,314,906 | 4/1967 | Bagley | 260—27 |
| 3,347,823 | 10/1967 | Buckley et al. | 260—45.85 |
| 3,367,997 | 2/1968 | Smith | 260—891 |

DONALD E. CZAJA, *Primary Examiner.*

R. A. WHITE, *Assistant Examiner.*

U.S. Cl. X.R.

260—27, 45.75, 45.8, 45.85